United States Patent
Adrangi et al.

(10) Patent No.: US 10,135,494 B2
(45) Date of Patent: Nov. 20, 2018

(54) CONNECTION AND SYNCHRONIZATION WITH A DEVICE IN A NON-ACTIVE STATE BASED ON NEAR FIELD COMMUNICATION

(75) Inventors: Farid Adrangi, Lake Oswego, OR (US); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 13/976,073

(22) PCT Filed: Dec. 16, 2011

(86) PCT No.: PCT/US2011/065504
§ 371 (c)(1),
(2), (4) Date: Mar. 28, 2014

(87) PCT Pub. No.: WO2013/089799
PCT Pub. Date: Jun. 20, 2013

(65) Prior Publication Data
US 2014/0220886 A1 Aug. 7, 2014

(51) Int. Cl.
*H04B 5/00* (2006.01)
*H04W 52/02* (2009.01)
(Continued)

(52) U.S. Cl.
CPC ............ *H04B 5/0031* (2013.01); *H04B 5/00* (2013.01); *H04W 52/0229* (2013.01);
(Continued)

(58) Field of Classification Search
None
See application file for complete search history.

(56) References Cited

U.S. PATENT DOCUMENTS

| 5,640,519 A * | 6/1997 | Langendorf .......... G06F 13/364 710/111 |
| 5,708,782 A * | 1/1998 | Larson ................... G06Q 30/02 194/211 |

(Continued)

FOREIGN PATENT DOCUMENTS

| WO | WO2010008251 | * | 1/2010 | ............... H04B 5/00 |
| WO | 2013/089779 A1 | | 6/2013 | |

OTHER PUBLICATIONS

International Preliminary Report on Patentability and Written Opinion received for PCT Patent Application No. PCT/US2011/065504, dated Jun. 26, 2014, 14 pages.
(Continued)

*Primary Examiner* — Zhiyu Lu
(74) *Attorney, Agent, or Firm* — Schiff Hardin LLP

(57) ABSTRACT

Technologies for one-tap connection and synchronization with a device in a non-active state are disclosed. When a user brings a first device enabled for Near Field Communication (NFC) to close proximity of a second NFC-enabled device when the second device is in a non-active state, the second device may be awakened, or placed in an active state, for a period of time to perform one or more operations before returning to the non-active state. These operations include, for example, allowing the first device to access data stored in the second device and synchronizing one or more applications installed on the second device with remote servers.

29 Claims, 4 Drawing Sheets

(51) Int. Cl.
*H04W 8/20* (2009.01)
*H04W 92/18* (2009.01)

(52) U.S. Cl.
CPC .............. *H04W 8/20* (2013.01); *H04W 92/18* (2013.01); *Y02D 70/00* (2018.01); *Y02D 70/142* (2018.01); *Y02D 70/144* (2018.01); *Y02D 70/166* (2018.01); *Y02D 70/42* (2018.01)

(56) References Cited

U.S. PATENT DOCUMENTS

| | | | | |
|---|---|---|---|---|
| 5,758,098 | A * | 5/1998 | Townsley | G06F 13/4291 710/110 |
| 6,215,703 | B1 * | 4/2001 | Bogin | G06F 13/1605 365/185.33 |
| 6,246,256 | B1 * | 6/2001 | Liu | G06F 5/065 326/37 |
| 6,389,556 | B1 * | 5/2002 | Qureshi | G06F 9/4418 711/112 |
| 6,700,899 | B1 * | 3/2004 | Cao | H04L 12/433 370/450 |
| 7,031,665 | B1 * | 4/2006 | Trell | H04M 11/04 340/5.1 |
| 8,527,688 | B2 * | 9/2013 | Chatterjee | G06F 1/1632 336/221 |
| 8,887,212 | B2 * | 11/2014 | Dua | H04N 7/163 380/201 |
| 9,824,376 | B1 * | 11/2017 | Amacker | G06Q 30/06 |
| 2006/0214767 | A1 * | 9/2006 | Carrieri | G07C 9/00158 340/5.61 |
| 2008/0207124 | A1 * | 8/2008 | Raisanen | G06F 21/70 455/41.2 |
| 2008/0209199 | A1 * | 8/2008 | Sadovsky | G06F 9/4401 713/2 |
| 2008/0270814 | A1 | 10/2008 | Starr et al. | |
| 2009/0058635 | A1 * | 3/2009 | LaLonde | A61N 1/37282 340/539.11 |
| 2009/0077347 | A1 * | 3/2009 | Edwards | G06F 1/3209 712/34 |
| 2009/0089565 | A1 | 4/2009 | Buchanan et al. | |
| 2009/0296742 | A1 * | 12/2009 | Sicurello | A61B 5/0002 370/527 |
| 2010/0009627 | A1 * | 1/2010 | Huomo | H04B 5/0031 455/41.1 |
| 2010/0014626 | A1 * | 1/2010 | Fennell | A61B 5/0002 377/15 |
| 2010/0068970 | A1 * | 3/2010 | Fong | A63H 3/28 446/330 |
| 2010/0099354 | A1 | 4/2010 | Johnson | |
| 2010/0279745 | A1 * | 11/2010 | Westcott | H04W 52/0274 455/574 |
| 2010/0315225 | A1 * | 12/2010 | Teague | A61B 5/0024 340/539.12 |
| 2010/0324977 | A1 * | 12/2010 | Dragt | G06Q 30/0257 705/14.1 |
| 2011/0070837 | A1 * | 3/2011 | Griffin | H04B 5/0062 455/41.3 |
| 2011/0264937 | A1 * | 10/2011 | Meisner | G06F 1/3228 713/323 |
| 2011/0307548 | A1 * | 12/2011 | Fisk | H04L 29/06 709/203 |
| 2012/0003933 | A1 * | 1/2012 | Baker | A61B 5/0002 455/41.2 |
| 2012/0329388 | A1 * | 12/2012 | Royston | H04W 4/008 455/41.1 |
| 2013/0006650 | A1 * | 1/2013 | Bocirnea | G06Q 10/10 705/2 |
| 2013/0217334 | A1 * | 8/2013 | Yu | H04W 76/10 455/41.2 |
| 2014/0215248 | A1 * | 7/2014 | Cheng | G06F 1/3231 713/323 |

OTHER PUBLICATIONS

International Search Report and Written Opinion Received for PCT Patent Application No. PCT/US2011/065504, dated Aug. 24, 2012, 12 pages.

* cited by examiner

CONNECTION AND SYNCHRONIZATION WITH A DEVICE IN A NON-ACTIVE STATE BASED ON NEAR FIELD COMMUNICATION

BACKGROUND

Near Field Communication (NFC) is a standards-based connectivity technology that establishes wireless connection between two devices in close proximity of each other, typically in the order of a few centimeters. NFC allows users to transfer information by touching, or tapping, one device with another device. As with proximity card technology, NFC uses magnetic induction between two loop antennas located within two NFC-enabled devices that are in close proximity of each other, effectively forming an air-core transformer.

The act of bringing one NFC-enabled device to close proximity of another NFC-enabled device with or without the two devices physically contacting each other, referred to as an "NFC tap" or "one tap" operation hereinafter. With an NFC tap operation, a user can conveniently perform a variety of tasks, including mobile payment, secure login, wireless pairing, triggering peer-to-peer data exchange, file transfer, file sharing, mobile gaming, user identification, and so on. For example, by tapping an NFC-enabled computing device, such as a notebook computer or a desktop computer, with an NFC-enabled smartphone, information exchange between the laptop and the smartphone can take place while the two devices remain in close proximity, e.g., within 4 centimeters and theoretically up to 20 centimeters. In the United States, for instance, many smartphones currently on the market already contain embedded NFC chips that can send encrypted data a short distance to a reader located next to a retail cash register.

Presently, for an NFC tap operation to be carried out, both the tapping device and the tapped device need to be powered on and in an active state, e.g., not in a sleeping state. Take the above-mentioned NFC-enabled smartphone and NFC-enabled notebook computer as an example. When the lid of the notebook computer is closed, the notebook computer is typically in a state other than the Advanced Configuration and Power Interface (ACPI) S0 state. In other words, the notebook is in an active or working state. When the lid of the notebook computer is closed, a user may need to open the notebook computer's lid to "wake" it up by placing it in the ACPI state S0 in order for the notebook computer to interact with the smartphone based on the NFC technology.

An NFC-enabled notebook computer may be enabled for Always On Always Connected (AOAC). Such AOAC notebook computer may enter into a sleeping or non-active state when not being used, e.g., after being idle for a certain period, to conserve energy. However, even when the AOAC notebook computer is in the sleeping or other non-active state, the AOAC notebook computer still needs to wake up periodically to scan for application processes. The periodic waking of the AOAC notebook computer typically involves a real-time communication timer to allow applications to synchronize. This would introduce system complexity pertaining to system thermal management (especially if the notebook computer is in a bag), impact on battery life due to longer periodic wakes, possible operation system crash due to frequent repeated wakes, etc.

Furthermore, a purpose of waking up an NFC-enabled device from a sleeping or other non-active state may be to allow one or more applications installed on the device to synchronize with a server or another device. However, network connectivity during the time when the NFC-enabled device is in an active state may not be guaranteed. In other words, waking the NFC-enabled device may still result in unsuccessful synchronization.

BRIEF DESCRIPTION OF THE DRAWINGS

The Detailed Description is described with reference to accompanying figures. In the figures, the left-most digit(s) of a reference number identifies the figure in which the reference number first appears. The same numbers are used throughout the drawings to reference like features and components.

DETAILED DESCRIPTION

Figure 1:
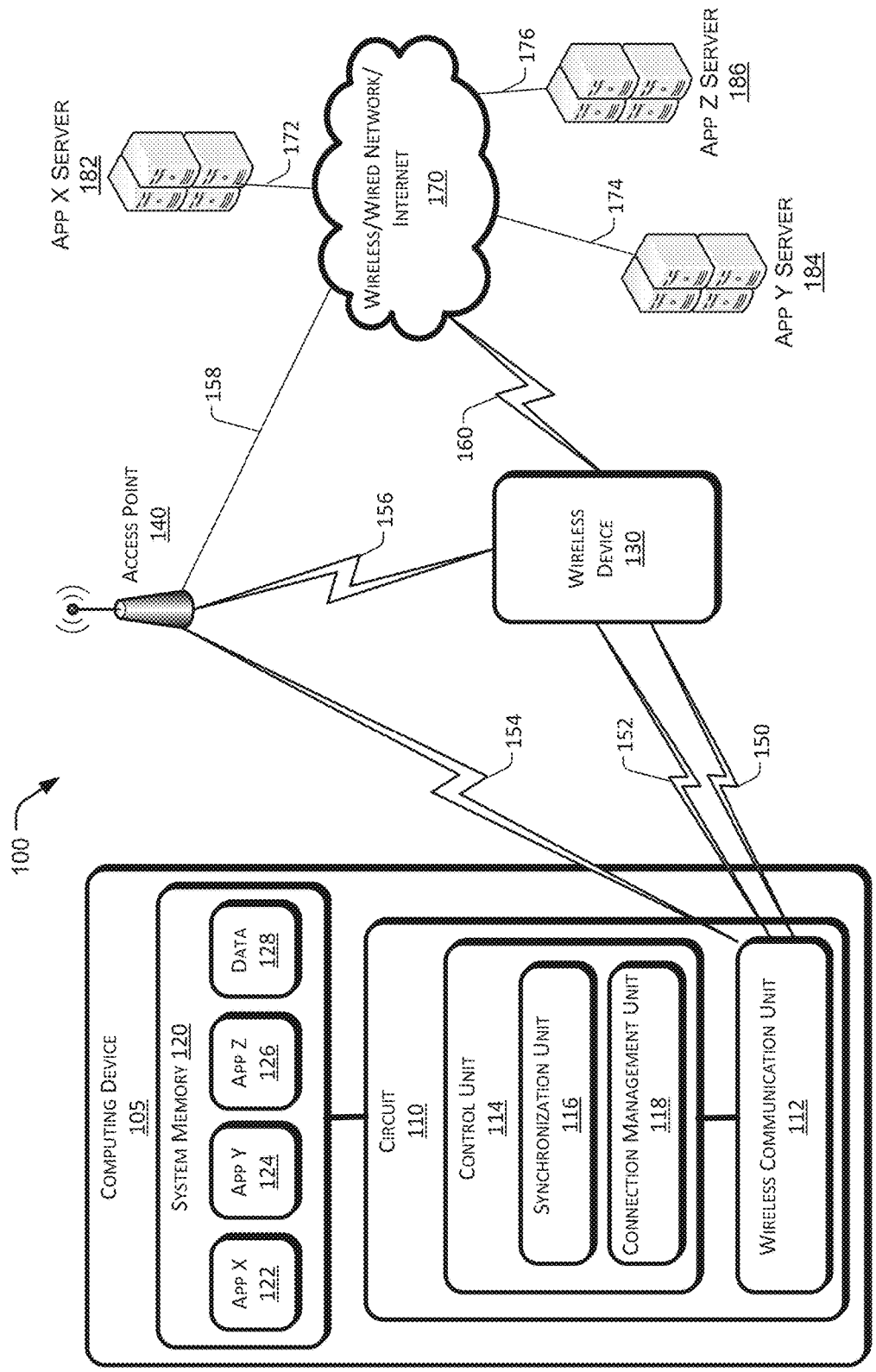
FIG. 1 is a block diagram illustrating an example framework implementing one-tap connection and synchronization with a device initially in a non-active state in accordance with the present disclosure.

With one or more implementations described herein, when a user "NFC taps" an NFC-enabled device that is in a non-active state with another NFC-enabled device, the non-active device temporarily activates for a short period of time or perhaps just long enough to carry out one or more tasks before returning to the non-active state. One of the tasks may be, for example, allowing one device to access certain data stored in the other device. Another example task may involve synchronizing one or more applications installed on the just-activated device with one or more remote servers. If the to-be-activated device can carry out a task requested by the tapping device while the to-be-activated device is in the non-active state, then to-be-activated device will not be awakened unnecessarily because of the NFC tap operation by the tapping device. Moreover, the tapping device needs to be an authorized device as verified by the to-be-activated device in order for the tapping device to trigger the to-be-activated device to carry out tasks via the NFC tap operation.

Overview

Described herein are architectures, platforms, methods, devices, etc. that enable one-tap connection and synchronization between two NFC-enabled devices when one of the devices is in a non-active state. A user holding a first device may initiate the one-tap connection and synchronization by tapping a second device that is in a non-active state with the first device, or by bringing the first device to close proximity of the second device without the first device actually contacting the second device. A communication unit capable of NFC-based communication in the second device detects the presence of the first device and receives information from the first device. Based on the information received from the first device, a control unit in the second device determines whether the second device should be in an active state to carry out one or more tasks as requested by the first device.

The second device may transition from the non-active state to the active state and remain in the active state for at most a predetermined duration to carry out the one or more tasks requested by the first device.

The disclosed techniques allow users to use an NFC tap operation with a handheld device to wake a computing device that is initially in a non-active state, such as an ACPI state other than the S0 (S-zero) state, without the user manually waking the computing device. Once awakened, or placed in an active state such as the ACPI state S0, the computing device may be triggered to carry out a number of tasks during a set amount of time. When the time is up or after the tasks have been completed, whichever occurs first, the computing device may return to the non-active state.

For example, a user may work with an email application that is installed on an NFC-enabled notebook computer while on an airplane with the notebook computer not connected to a network. The user may reply to emails, compose new emails, and so on. When the user exits the airplane the user may simply tap his NFC-enabled smartphone on the notebook computer, with its lid closed, to launch the email application to synchronize with a remote back-end server, resulting in emails being sent and received. As another example, the user may tap the smartphone on the notebook computer, which has its lid closed or is in a non-ACPI state S0, to gain access to the notebook computer, navigate through media library stored on the notebook computer, select and play media on the smartphone without manually waking the notebook computer.

The disclosed techniques implement an efficient wake policy for Always On Always Connected (AOAC) devices. With the disclosed techniques implemented, an AOAC device does not need to periodically wake up and scan for application processes. Rather, the AOAC device is informed when an application process of interest is available by another device via NFC.

As part of the NFC tap operation, a user may indicate what type of data is to be synchronized, e.g., emails this time, or emails and social media posts this time, etc. The disclosed techniques render AOAC operations efficient as the up time of the AOAC device shortened, thus conserving battery life.

Example Framework

FIG. 1 illustrates an example framework 100 that implements one-tap connection and synchronization between a wireless device 130 and a computing device 105 with the computing device 105 initially in a non-active state. In an implementation, both the computing device 105 and the wireless device 130 are equipped with necessary hardware and/or software to enable them to establish wireless communication based on the NFC technology. As an example for illustrative purpose, the computing device 105 may be an NFC-enabled notebook computer or laptop computer, and the wireless device 130 may be an NFC-enabled smartphone. When the wireless device 130 is in close proximity of the computing device 105, a wireless connection 150 based on NFC between the wireless device 130 and the computing device 105 exists thus allowing the detection of the presence of the wireless device 130 based on NFC.

The framework 100 may additionally include a network 170, which represents a combination of one or more wired and wireless networks and the Internet, and a number of back-end servers communicatively coupled to the network 170, such as application X server 182, application Y server 184, and application Z server 186, via network connections 172, 174, 176, respectively. The wireless device 130 is communicatively coupled to the network 170 via wireless connection 160, and is able to receive information from and provide information to servers connected to the network 170, such as the servers 182, 184, 186. The computing device 105, or components of the computing device 105, may establish communication with the network 170 as well as one or more of the servers 182, 184, 186 via the wireless device 130. Those ordinarily skilled in the art would appreciate that, although a set number of back-end servers are shown in FIG. 1, in various implementations the number of back-end servers connected to the network 170 may differ.

The framework 100 may further include a Wi-Fi access point 140. The wireless device 130 may communicate with the access point 140 via Wi-Fi connection 156. The computing device 105 may also communicate with the access point 140 via Wi-Fi connection 154 after the wireless device 130 has already scanned and identified the access point 140 to be legitimate and safe for use. The access point 140 may be communicatively coupled to the network 170 via network connection 158.

The computing device 105 may include a circuit 110 and system memory 120 coupled to the circuit 110. The circuit 110 may include a wireless communication unit 112 and a control unit 114 coupled to the wireless communication unit 112. The system memory 120 may have software applications and data stored therein, such as application X 122, application Y 124, application Z 126, and data file 128 as illustrated in FIG. 1. Those ordinarily skilled in the art would appreciate that, although a set number of applications and data file are shown in FIG. 1, in various implementations the number of applications and data files stored in the system memory 120 may differ. In some embodiments, the circuit 110 and the system memory 120 may be integral parts of an integrated circuit, or chip. Alternatively, the circuit 110 and the system memory 120 may be separate integrated circuits. In some embodiments, the control unit 114 and the wireless communication unit 112 may be integral parts of a chip. Alternatively, the control unit 114 and the wireless communication unit 112 may be separate chips, as in a chipset. In some embodiments, part of the circuit 110 may include hardware, firmware, software, or a combination thereof. In some embodiments, some of the hardware components of the circuit 110 may include discrete electronic components on a printed circuit board.

The wireless communication unit 112 is configured to establish wireless communication with one or more wireless devices, such as the wireless device 130, detect the presence of the wireless device 130 based on NFC when the wireless device is in close proximity, receive information from the wireless device 130, and transmit information to the wireless device 130. The wireless communication unit 130 may establish the wireless connection 150 with the wireless device 130 based on NFC. Optionally, the wireless communication unit 130 may also be capable to establish a non-NFC wireless connection 152 with the wireless device 130 based on another wireless technology, such as Wi-Fi, Bluetooth, radio frequency (RF) for example. Alternatively, the circuit 110 or the computing device 105 may have another wireless communication unit to establish the wireless connection 152 with the wireless device 130. The control unit 114 is configured to examine information received by the wireless communication unit 112 from one or more wireless devices, such as information transmitted by the wireless device 130 for example. The control unit 114 is configured to verify whether the wireless device from which the examined information is received is an authorized device. For example, the information received from the wireless device 130 may contain identification of the wireless device 130, e.g., a plain language description, a name given by its user, a serial number, a Media Access Control (MAC) number or the like. The control unit 114 may compare such identification with a table of identifications of devices that are authorized by a user of the computing device 105 to establish communication with the computing device 105. When there is a match between the identification of the wireless device 130 and the identification of an authorized device, the control unit 114 verifies the wireless device 130 as an authorized device, and further communication and operations may ensue. In an event that the wireless device 130 is not verified as an authorized device, the control unit 114 may prevent any action by the computing device 105 or any part thereof from being triggered by the wireless device 130.

The control unit 114 is also configured to determine whether the computing device 105 should transition from a non-active state to an active state according to a command, e.g., a wake command, in the information received from the wireless device 130. As an example, when the computing device 105 is in a non-active state, the computing device 105 may be in one of the following ACPI states: S2 (central processing unit powered off), S3 (standby), S4 (hibernation) and S5 (soft off). Similarly, when the computing device 105 is in an active state, the computing device 105 may be in the ACPI S0 (working) state. In an event that the control unit 114 determines the computing device 105 should be transitioned to the active state, e.g., ACPI S0, the control unit 114 issues a command or executes a procedure to cause the computing device 105 to wake to be in the active state, and remain in the active state for at most a predetermined duration, before the computing device 105 returns to the non-active state. The predetermined duration can have a default value, e.g., 30 seconds, and may be set and adjusted by a user, and may be of any length of time whether a few seconds, minutes, or hours.

As the technology of the present disclosure minimizes the length of the wake time of the computing device 105 that is initially in a non-active state, the control unit 114 may transition the computing device 105 back to the non-active state upon the expiration of the defined duration, or upon the completion of one or more tasks the computing device 105 is placed in the active state for, whichever occurs first. Alternatively or additionally, the control unit 114 may transition the computing device 105 back to the non-active state upon receiving a command, e.g., a shutdown command, from the wireless device 130 via another NFC tap operation to place the computing device 105 back to sleep, for example, regardless whether the defined duration has expired or whether the one or more tasks have been completed.

There may be cases when a request received from the wireless device 130 can be responded without waking the computing device 105. The control unit 114 is configured to identify any operation indicated in the information received from the wireless device 130 that can be carried out without the computing device 105 being in the active state, and carry out the operation(s) with the computing device 105 being in the non-active state. For example, if the information received from the wireless device 130 requests for certain data that is readily available to the control unit 114, the control unit 114 may provide such data to the wireless device 130 through the wireless communication unit 112 while the computing device 105 remains in the non-active state.

When the information received from the wireless device 130 includes a command to access data stored in the computing device 105, e.g., data 128 stored in the system memory 120, the control unit 114 is configured to transition the computing device 105 from the non-active state to the active state. The control unit 114 may then cause the wireless communication unit 112 to transmit the requested data 128 to the wireless device 130 in response to the command. After the data 128 has been transmitted to the wireless device 130 or when the defined duration expires, whichever occurs first, the control unit 114 transitions the computing device 105 from the active state to the non-active state. As an example for illustrative purpose, a user may tap the wireless device 130, e.g., a smartphone, on the computing device 105, e.g., a notebook computer having its lid closed, to remotely access data, such as files, photos, video clips and/or music files, stored in the computing device 105, e.g., system memory 120, without the user manually waking the computing device 105.

In some implementations, the circuit 110 may further comprise a synchronization unit 116 and a connection management unit 118 coupled to the synchronization unit 116. The synchronization unit 116 and the connection management unit 118 may be integral part of the control unit 114 as shown in FIG. 1 or, alternatively, the synchronization unit 116 and the connection management unit 118 may be separate from and coupled to the control unit 114. The synchronization unit 116 is configured to launch one or more applications installed on the computing device, such as application X 122, application Y 124, and application Z 126, and cause the one or more applications to respectively synchronize with one or more remote servers, such as application X server 182, application Y sever 184, and application Z server 186. The connection management unit 118 is configured to establish a communication connection, such as the wireless connection 152, with the wireless device 130 via the wireless communication unit 112 or another wireless communication unit of the computing device 105.

When the information received from the wireless device 130 contains a command to synchronize one or more of the applications installed on the computing device 105, the control unit 114 is configured to transition the computing device 105 form a non-active state to an active state, cause the connection management unit 118 to establish a first connection, such as wireless connection 152, with the wireless device 130, cause the synchronization unit 116 to launch the one or more applications and synchronize the one or more applications with one or more respective remote servers over the first connection. Upon the expiration of the defined duration or completion of the synchronization, whichever occurs first, or upon receiving a shutdown command from the wireless device 130, the control unit 114 is configured to transition the computing device 105 from the active state to the non-active state.

For example, when the information received from the wireless device 130 includes a command that selects one or more of application X 122, application Y 124 and application Z 126 to synchronize with application X server 182, application Y server 184 and application Z server 186, the control unit 114 places the computing device 105 in an active state, such as ACPI state S0, for at most a defined duration, e.g., 60 seconds. The defined duration may be predetermined, calculated, or otherwise some determinable period of time. During the defined duration, the selected application X 122, application Y 124 and/or application Z 126 synchronize with the application X server 182, application Y server 184 and/or application Z server 186. If the synchronization is completed before the defined duration expires, and there is no other task to be carried out by the computing device 105 while in the active state, the control unit 114 transitions the computing device 105 back to the non-active state. If the defined duration expires while the synchronization is in progress, the control unit 114 transitions the computing device 105 back to the non-active state. If a shutdown command is received from the wireless device 130 via another NFC tap operation, even before the synchronization is complete or before the defined duration expires, the control unit 114 transitions the computing device 105 back to the non-active state.

The information received from the wireless device 130 because of the NFC tap operation may include several pieces of information. Such pieces of information include: (1) a connection profile based on which the connection management unit establishes the first connection; (2) a list of operations for the computing device to execute when the computing device is in the active state during the defined duration; and (3) a shutdown policy indicating whether the computing device should shut down or stay in the active state after completing the operations in the list of operations.

The connection profile may include one or more of the following: (i) parameters relating to connecting to the wireless device via Wi-Fi; (ii) parameters relating to connecting to the wireless device via Bluetooth; and (iii) parameters relating to connecting to a public Wi-Fi access point that the wireless device has already scanned and identified to be legitimate and safe for use. For example, if the wireless device 130 is capable of communication via Wi-Fi, the connection profile may include parameters for the connection management unit 118 to set up a Wi-Fi connection, wireless connection 152, with the wireless device 130 via the wireless communication unit 112 or another wireless communication unit of the computing device 105. If the wireless device 130 is capable of communication via Bluetooth, the connection profile may include parameters for the connection management unit 118 to set up a Bluetooth connection, wireless connection 152, with the wireless device 130 via the wireless communication unit 112 or another wireless communication unit of the computing device 105. If the wireless device 130 has verified the access point 140 to be legitimate and safe for use, the connection profile may include parameters for the connection management unit 118 to set up the Wi-Fi connection 154 with the access point 140 via the wireless communication unit 112 or another wireless communication unit of the computing device 105.

Example Methods

Figure 2:
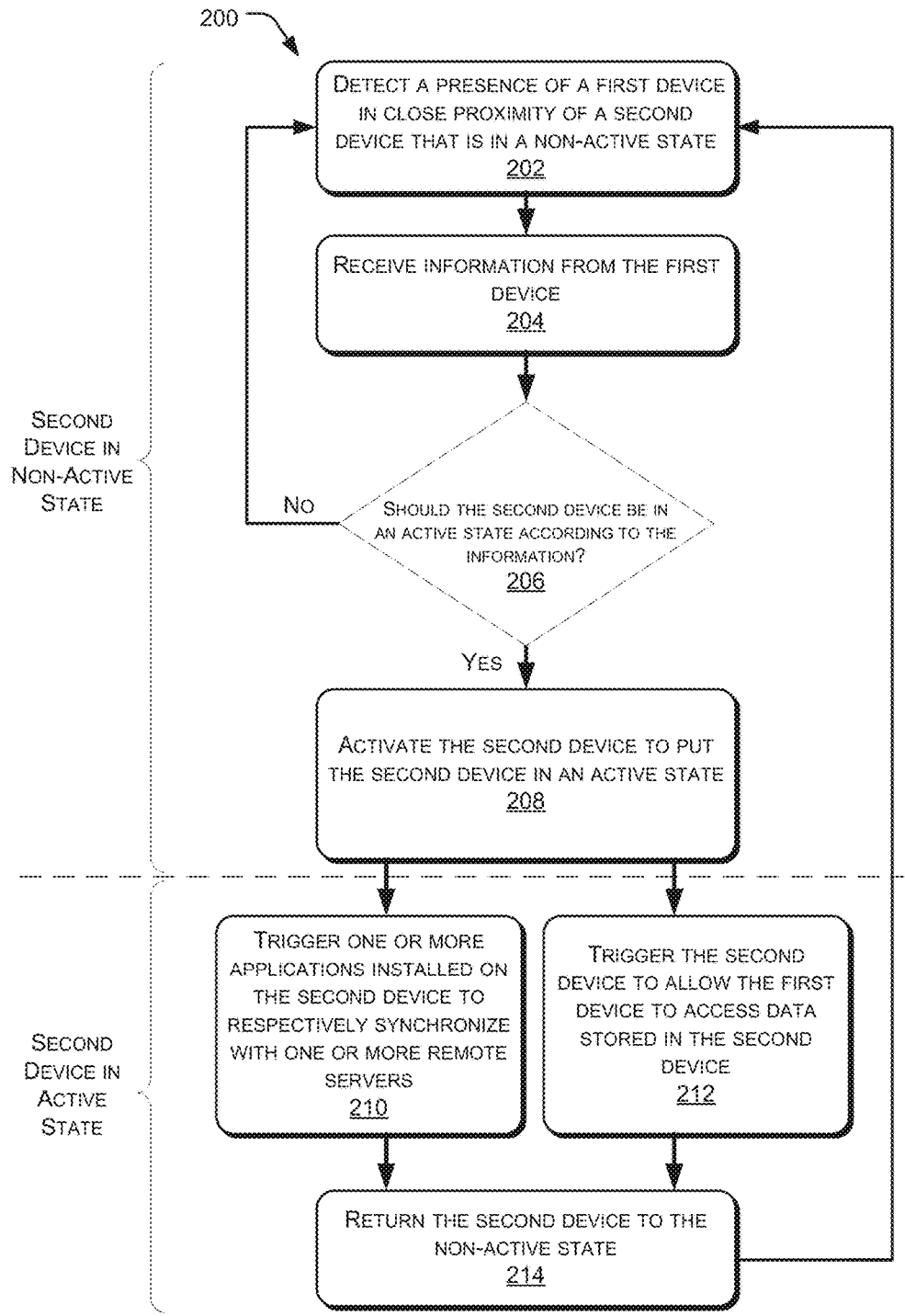
FIG. 2 is a flowchart illustrating an example method for one-tap connection and synchronization with a device initially in a non-active state in accordance with the present disclosure.

FIG. 2 illustrates an example method 200 for one-tap connection and synchronization with a device initially in a non-active state. Method 200 may be carried out by the computing device 105, or more specifically the circuit 110, with respect to the wireless device 130. The order in which the method blocks is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the present disclosure.

At block 202, a presence of a first device in close proximity of a second device that is in a non-active state is detected. For example, the wireless communication unit 112 of the computing device 105 detects a presence of the wireless device 130 because of a user tapping the wireless device 130 on the computing device 105, while the computing device 105 is in a non-active state.

At block 204, information is received from the first device. For example, information including a command is received by the wireless communication unit 112, and hence by the control unit 114, from the wireless device 130 via the NFC-based wireless connection 150.

At block 206, whether or not the second device should be in an active state is determined according to the information received from the first device. For example, based on the command in the information received from the wireless device 130, the control unit 114 determines whether the computing device 105 should be transitioned from the non-active state to an active state.

At block 208, in an event that it is determined the second device should be in the active state, the second device is placed in the active state for at most a defined duration before returning to the non-active state. For example, when the control unit 114 determines that the computing device 105 should be in the active state, e.g., to carry out one or more tasks, based on the command in the information received from the wireless device 130, the control unit 114 places the computing device 105 in the active state, e.g., ACPI state S0, for at most a defined duration, e.g., 30 seconds or 60 seconds. The control unit 114 may alternatively cause the computing device 105 to be placed in the active state by triggering a processor, a middleware module or a software module in the computing device 105 to place the computing device 105 in the active state.

In some embodiments, the presence of the first device in close proximity of the second device is based on NFC technology. For example, both the computing device 105, or more specifically the wireless communication unit 112, and the wireless device 130 are NFC-enabled. The wireless communication unit 112 detects the presence of the wireless device 130 based on the NFC technology because of an NFC tap operation, e.g., a user tapping the wireless device 130 on the computing device 105.

In some embodiments, the information received from the first device may include a command that causes one or more applications installed on the second device to synchronize with one or more respective remote servers upon the second device being in the active state. For example, a command in the information received from the wireless device 130 may cause one or more of the application X 122, application Y 124 and application Z 126 to respectively synchronize with the remote back-end application X server 182, application Y server 184 and application Z server 186.

In some embodiments, the command may include information indicative of a connection profile, a list of operations for the second device to execute when the second device is in the active state during the defined duration, and a shutdown policy indicating whether the second device should shut down or stay in the active state after completing the operations in the list of operations. For example, the command may indicate a connection profile for the computing device 105 to connect with the wireless device 130, e.g., for application synchronization and/or for the wireless device 130 to access data stored in the system memory 120. The command may also indicate a list of operations that the computing device 105 is to execute when the computing device 105 is in the active state during the defined duration. The command may also indicate a shutdown policy that tells the control unit 114 whether to shut down the computing device 105 upon completion of the operations in the list or to keep the computing device 105 in the active state until the expiration of the defined duration.

In some embodiments, the connection profile may include parameters relating to connecting to the first device via Wi-Fi, parameters relating to connecting to the first device via Bluetooth, or parameters relating to connecting to a public Wi-Fi access point that the first device has already scanned and identified to be legitimate and safe for use, or a combination thereof. For example, the wireless device 130 may be equipped to communicate based on Wi-Fi or Bluetooth, and accordingly the wireless device 130 provides pertinent parameters for the control unit 114, or more specifically the connection management unit 118, to set up the wireless connection 152, either a Wi-Fi connection or a Bluetooth connection depending on the case, with the wireless device 130. If there exists the Wi-Fi access point 140 and the access point 140 has been scanned and verified by the wireless device 130, the wireless device 130 may provide parameters for the control unit 114, or more specifically the connection management unit 118, to set up the Wi-Fi connection 154 with the access point 140.

At block 210, when the second device is in the active state during the defined duration, the one or more applications are triggered to synchronize with the one or more remote servers, respectively. For example, when the information received from the wireless device 130 includes a command for one or more of the application X 122, application Y 124 and application Z 126 to synchronize with the respective application X server 182, application Y server 184 and application Z server 186, the synchronization unit 116 causes or launches the selected application(s) to synchronize with the respective back-end server(s). In some embodiments, the second device returns to the non-active state upon the one or more applications completing synchronization with the one or more respective remote servers, or upon expiration of the defined duration, whichever occurs first. For example, in the case of one or more of the application X 122, application Y 124 and application Z 126 synchronizing with the respective application X server 182, application Y server 184 and application Z server 186, the control unit 114 may cause the computing device 105 to transition back to the non-active state, e.g., ACPI state S2, S3, S4 or S5, when the defined duration expires or when the synchronization is complete, whichever occurs first. Alternatively, if the wireless device 130 sends a shutdown command via another NFC tap operation, the control unit 114 may shut down the computing device 105 regardless whether the defined duration has expired or whether the synchronization is complete.

In some embodiments, the information received from the first device may include a command that causes the second device to allow the first device to access data stored in the second device upon the second device being in the active state. For example, a command in the information received from the wireless device 130 may cause the computing device 105, or more specifically the control unit 114, to allow the wireless device 130 to access data file 128 stored in the system memory 120 of the computing device 105 when the computing device 105 is in the active state.

At block 212, when the second device is in the active state during the defined duration, the second device is triggered to allow the first device to access data stored in the second device. For example, the command in the information received from the wireless device 130 may indicate a request to access data file 128, stored in the system memory 120 of the computing device 105, by the wireless device 130. In some embodiments, the second device is caused to return to the non-active state upon completion of the first device accessing data stored in the second device, or upon expiration of the defined duration, whichever occurs first. For example, in the case of the wireless data 130 access the data file 128, the control unit 114 may cause the computing device 105 to transition back to the non-active state, e.g., ACPI state S2, S3, S4 or S5, when the defined duration expires or when the data access by the wireless device 130 is complete, whichever occurs first. Alternatively, if the wireless device 130 sends a shutdown command via another NFC tap operation, the control unit 114 may shut down the computing device 105 regardless whether the defined duration has expired or whether the synchronization is complete.

At block 214, the second device is returned to the non-active state. For example, whether because of the expiration of the defined duration, the completion of the tasks/operations carried out by the computing device 105, or receiving a shutdown command from the wireless device 130, the control unit 114 returns the computing device 105 to the non-active state.

Figure 3:
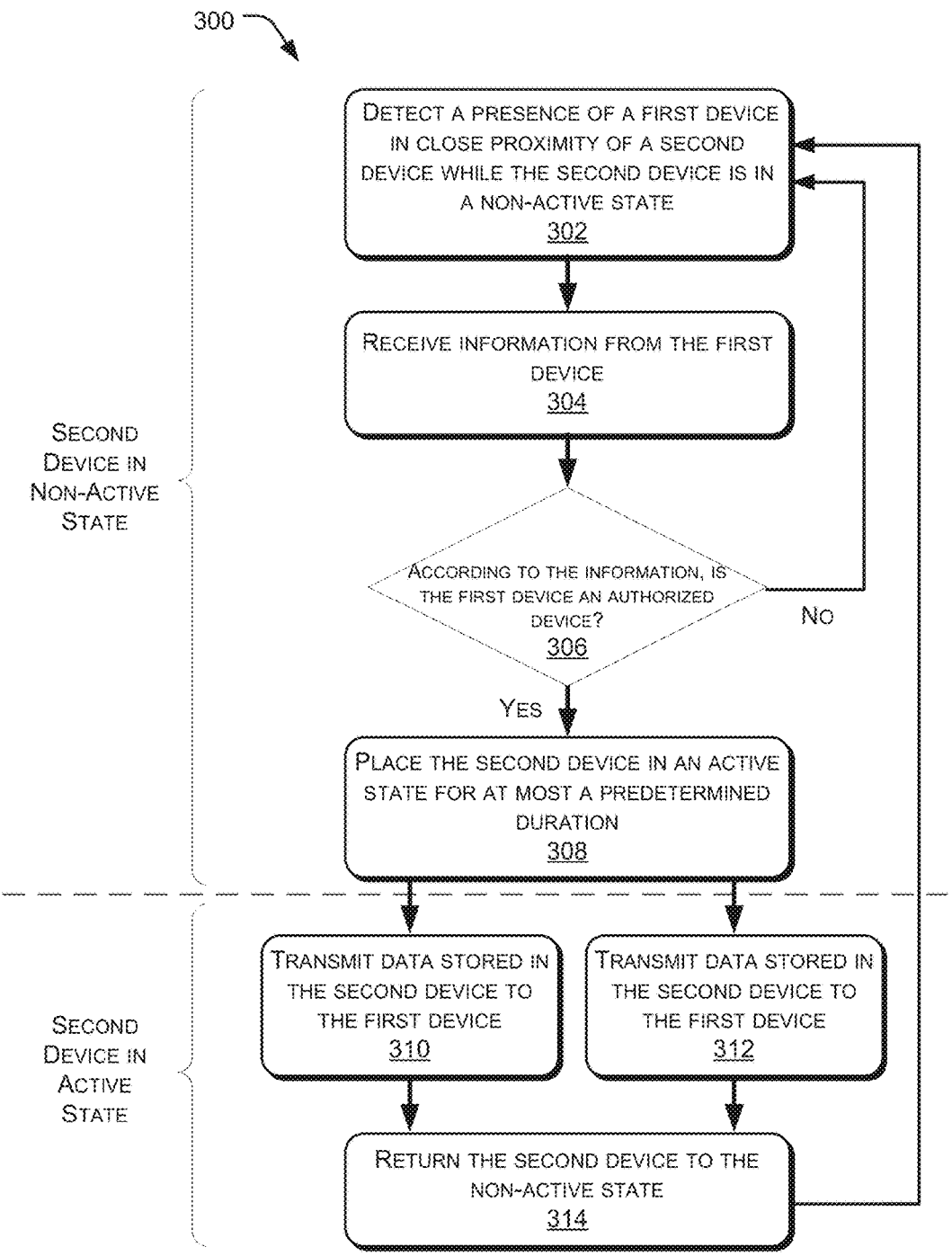
FIG. 3 is a flowchart illustrating another example method for one-tap connection and synchronization with a device initially in a non-active state in accordance with the present disclosure.

FIG. 3 illustrates another example method 300 for one-tap connection and synchronization with a device initially in a non-active state. Method 300 may be carried out by the computing device 105, or more specifically the circuit 110, with respect to the wireless device 130. The order in which the method blocks is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the present disclosure.

At block 302, a presence of a first device in close proximity of a second device, while the second device is in a non-active state, is detected. For example, the wireless communication unit 112 of the computing device 105 detects a presence of the wireless device 130 because of a user tapping the wireless device 130 on the computing device 105, while the computing device 105 is in a non-active state.

At block 304, information is received from the first device. For example, information including a command is received by the wireless communication unit 112, and hence by the control unit 114, from the wireless device 130 via the NFC-based wireless connection 150.

At block 306, whether or not the first device is an authorized device is determined according to the information received from the first device. For example, based on the information received from the wireless device 130, the control unit 114 determines whether the wireless device 130 is an authorized device, e.g., the wireless device 130 is an authorized device previously registered with the computing device 105.

At block 308, in an event that it is determined the first device is an authorized device, the second device is placed in an active state for at most a defined duration before returning the second device to the non-active state. For example, once the control unit 114 determines the wireless device 130 as an authorized device, the control unit 114 places the computing device 105 in an active state, e.g., ACPI state S0, for at most a defined duration, e.g., 30 seconds, 45 seconds or 60 seconds.

At block 310, data stored in the second device is transmitted to the first device in response to a command requesting for the data in the information received from the first device. For example, when a command in the information received from the wireless device 130 indicates the wireless device 130 is to access data file 128, the wireless communication unit 112 or another wireless communication unit transmits data in the data file 128 to the wireless device 130 via the wireless connection 152.

At block 312, one or more applications installed on the second device are launched to synchronize with one or more respective remote servers in response to a command requesting for the data in the information received from the first device. For example, when the information received from the wireless device 130 includes a command for one or more of the application X 122, application Y 124 and application Z 126 to synchronize with the respective application X server 182, application Y server 184 and application Z server 186, the synchronization unit 116 causes or launches the selected application(s) to synchronize with the respective back-end server(s).

At block 314, the second device is returned to the non-active state. For example, upon completion of accessing the data file 128 by the wireless device 130, or completion of synchronizing one or more of the application X 122, application Y 124 and application Z 126, or expiration of the defined duration, the control unit 114 transitions the computing device 105 back to the non-active state, e.g., ACPI state S2, S3, S4 or S5.

Example Computing Device

Figure 4:
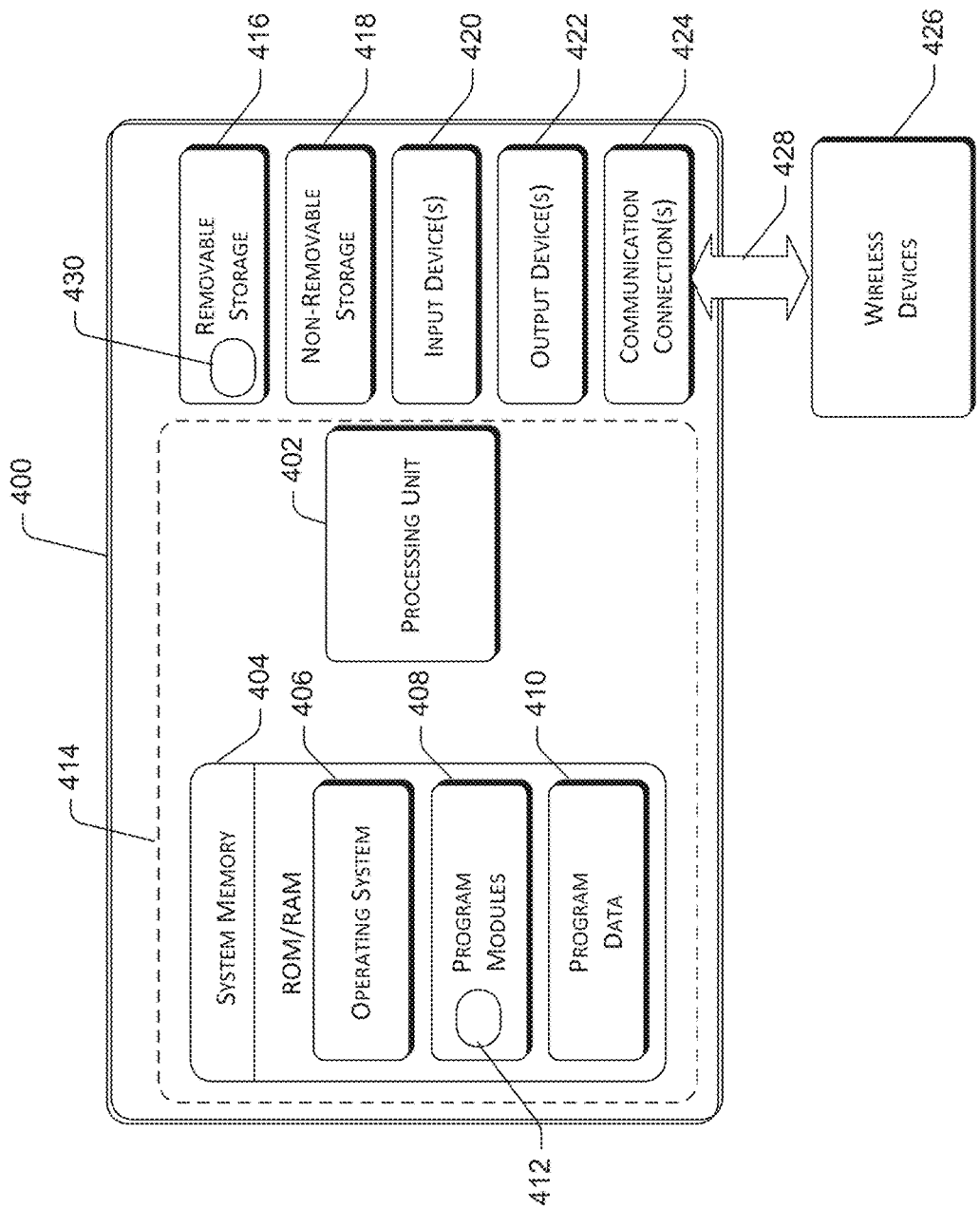
FIG. 4 is a block diagram illustrating an example computing device that implements a one-tap connection and synchronization scheme when initially in a non-active state in accordance with the present disclosure.

FIG. 4 illustrates an example computing device 400 that implements a one-tap connection and synchronization scheme when initially in a non-active state. However, it will be readily appreciated that the techniques disclosed herein may be implemented in other computing devices, systems, and environments. The computing device 400 shown in FIG. 4 is one example of a computing device and is not intended to suggest any limitation as to the scope of use or functionality of the computer and network architectures.

In at least one implementation, computing device 400 typically includes at least one processing unit 402 and system memory 404. Depending on the exact configuration and type of computing device, system memory 404 may be volatile (such as RAM), non-volatile (such as ROM, flash memory, etc.) or some combination thereof. System memory 404 may include an operating system 406, one or more program modules 408, and may include program data 410. A basic implementation of the computing device 400 is demarcated by a dashed line 414.

The program module 408 may include a module 412 configured to implement the one-tap connection and synchronization scheme as described above. For example, the module 412 may carry out one or more of the method 200 and the method 300, and variations thereof, e.g., the computing device 400 acting as described above with respect to computing device 105 when in a non-active state.

Computing device 400 may have additional features or functionality. For example, computing device 400 may also include additional data storage devices such as removable storage 416 and non-removable storage 418. In certain implementations, the removable storage 416 and non-removable storage 418 are an example of computer accessible media for storing instructions that are executable by the processing unit 402 to perform the various functions described above. Generally, any of the functions described with reference to the figures can be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 400 and computing device 105. Any of such computer accessible media may be part of the computing device 400.

In one implementation, the removable storage 416, which is a computer accessible medium, has a set of instructions 430 stored thereon. When executed by the processing unit 402, the set of instructions 430 cause the processing unit 402 to execute operations, tasks, functions and/or methods as described above, including method 200, method 300 and any variations thereof.

Computing device 400 may also include one or more input devices 420 such as keyboard, mouse, pen, voice input device, touch input device, etc. Computing device 400 may additionally include one or more output devices 422 such as a display, speakers, printer, etc.

Computing device 400 may also include one or more communication connections 424 that allow the computing device 400 to communicate with one or more wireless devices 426, such as the NFC-enabled wireless device 130, over wireless connection 428 based on NFC, Wi-Fi, Bluetooth, RF or a combination thereof.

Other Implementations Details and Notes

In the Detailed Description, numerous specific details are set forth in order to provide a thorough understanding of the present disclosure. However, those of ordinary skill in the art would appreciate that the present disclosure may be practiced without these specific details. In other instances, well-known methods, procedures, components and circuits have not been described in detail so as not to obscure the present disclosure.

Realizations in accordance with the present disclosure have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the present disclosure as defined in the claims that follow.

What is claimed is:

1. A method comprising:
    detecting a presence of a first device in close proximity of a second device, the second device being in a non-active state, wherein the non-active state is an Advanced Configuration and Power Interface (ACPI) state other than ACPI state S0 (S-zero state);
    receiving from the first device information including a command that includes a list of operations that the second device is directed to perform once the second device activates into an active state, and a shutdown policy indicating whether the second device should shut down or stay in the active state after completing one or more operations in the list of operations;
    determining whether or not the second device should be in the active state according to the command received from the first device;
    activating the second device in response to the determination that the information indicates an activation of the second device, wherein the activating includes changing the second device into the active state; and
    performing, by the second device, the one or more operations in the list of operations.

2. The method as recited in claim 1, wherein the one or more operations performed by the second device include allowing the first device to access data stored on the second device.

3. The method as recited in claim 1, wherein the second device remains in the active state for up to a defined duration before returning to the non-active state.

4. The method as recited in claim 1, wherein the detecting the presence of the first device in close proximity of the second device includes detecting the presence of the first device in close proximity of the second device based on Near Field Communication (NFC) technology.

5. The method as recited in claim 1, wherein the detecting the presence of the first device in close proximity of the second device includes recognition of a Near Field Communication (NFC) tap between the first and second devices.

6. The method as recited in claim 1, further comprising:
    in response to the information being received from the first device, triggering one or more applications installed on the second device to synchronize with one or more respective remote servers upon the second device being in the active state.

7. The method as recited in claim 6, wherein the command includes information that indicates a connection profile.

8. The method as recited in claim 7, wherein the connection profile includes parameters relating to connecting to the first device via Wi-Fi, connecting to the first device via Bluetooth, or connecting to a public Wi-Fi access point that the first device has already scanned and identified to be legitimate and safe for use.

9. The method as recited in claim 6, wherein activating the second device includes directing the second device to return to the non-active state upon the one or more applications completing synchronization with the one or more respective remote servers or upon an expiration of a defined duration, whichever occurs first.

10. The method as recited in claim 1, wherein after the activating and while the second device is in the active state, the method further comprising:
    directing one or more applications to synchronize with one or more respective remote servers.

11. The method as recited in claim 1, wherein the command triggers the second device to allow the first device to access data stored in the second device while the second device is in the active state.

12. The method as recited in claim 11, wherein after the activating and while the second device is the active state, the method further comprising:
    directing the second device to return to the non-active state upon completion of the first device accessing the data stored in the second device or upon expiration of a defined duration, whichever occurs first.

13. A circuit comprising:
    a wireless detector configured to detect a presence of a wireless device that is in close proximity of the wireless detector and receive information including a command that includes a list of operations, and a shutdown policy indicating whether a computing device in which the circuit is installed should shut down or stay in the active state after completing operations in the list of operations; and
    a controller coupled to the wireless detector, the controller configured to:
        verify whether the wireless device is an authorized device according to the information received from the wireless device;
        determine that the computing device in which the circuit is installed should transition from a non-active state to an active state according to the command received from the wireless device, wherein the non-active state is an Advanced Configuration and Power Interface (ACPI) state other than the active state, and wherein the active state is an ACPI S0 state (S-zero state); and
        activate the computing device so that the computing device remains in the active state for a defined duration, or less, before returning to the non-active state.

14. The circuit as recited in claim 13, wherein the controller is further configured to perform one or more operations when the computing device is in the active state and before the computing device returns to the non-active state.

15. The circuit as recited in claim 13, wherein, according to the information received from the wireless device, the controller is further configured to:
    identify a first operation indicated in the information that can be executed without the computing device being in the active state; and
    execute the first operation with the computing device in the non-active state.

16. The circuit as recited in claim 13, wherein, according to the information received from the wireless device, the controller is further configured to:
    transition the computing device from the non-active state to the active state;
    cause the wireless detector to transmit data stored in the computing device to the wireless device in response to receiving the information that includes the command from the wireless device; and
    transition the computing device from the active state to the non-active state upon completing transmission of the data to the wireless device in accordance with the shutdown policy, or upon an expiration of the defined duration, whichever occurs first.

17. The circuit as recited in claim 13, further comprising:
    a synchronizer configured to launch one or more applications installed on the computing device, and to cause the one or more applications to synchronize with one or more respective remote servers; and a connection manager coupled to the synchronizer, and configured to communicatively establish a network connection with the one or more remote servers.

18. The circuit as recited in claim 13, wherein, according to the command in the information received from the wireless device, the controller is further configured to:

transition the computing device from the non-active state to the active state;

cause a connection manager to communicatively establish a first connection with the wireless device;

cause a synchronizer to launch a first application installed on the computing device and synchronize the first application with a first remote server over the first connection; and transition the computing device from the active state to the non-active state upon completing the synchronization of the first application with the first remote server in accordance with the shutdown policy, or upon an expiration of the defined duration, whichever occurs first.

19. The circuit as recited in claim 18, wherein the command further includes information indicative of a connection profile based on which the connection manager establishes the first connection, the list of operations for the computing device to execute when the computing device is in the active state during the defined duration, and the shutdown policy.

20. The circuit as recited in claim 19, wherein the connection profile includes parameters relating to connecting to the wireless device via Wi-Fi, connecting to the wireless device via Bluetooth, or connecting to a public Wi-Fi access point.

21. The circuit as recited in claim 13, wherein the wireless detector employs a Near Field Communication (NFC) technology.

22. A non-transitory computer accessible medium having stored thereon a set of instructions that, when executed by one or more processors, direct the one or more processors to execute operations comprising:

detecting a presence of a first device in close proximity of a second device while the second device is in a non-active state, wherein the non-active state is an Advanced Configuration and Power Interface (ACPI) state other than an active state, and wherein the active state is an ACPI S0 state (S-zero state);

receiving from the first device information including a list of operations, and a shutdown policy indicating whether the second device should shut down or stay in the active state after completing one or more operations in the list of operations;

determining, according to the list of operations received from the first device, whether or not the first device is an authorized device;

in an event that it is determined the first device is an authorized device and based from the received list of operations, placing the second device in an active state for at most a predetermined duration before returning the second device to the non-active state in accordance with the shutdown policy; and enabling the activated second device to have the first device gain access to data stored on the activated second device based on the received information.

23. The non-transitory computer accessible medium of claim 22, wherein the operations further comprise:

transmitting the data stored in the second device to the first device in response to the information received from the first device having a command requesting the data stored in the second device; and returning the second device to the non-active state upon completion of the transmission of the data stored in the second device to the first device in accordance with the shutdown policy, or upon an expiration of the predetermined duration, whichever occurs first.

24. The non-transitory computer accessible medium of claim 22, wherein the operations further comprise:

launching one or more applications installed on the second device to synchronize with one or more respective remote servers in response to the information received from the first device having a command requesting the data stored in the second device; and returning the second device to the non-active state upon the one or more applications completing the synchronization with the one or more respective remote servers in accordance with the shutdown policy, or upon an expiration of the predetermined duration, whichever occurs first.

25. A computing system comprising:

one or more processors configured to execute instructions;

a memory configured to store thereon a set of instructions that, when executed by the one or more processors, direct the one or more processors to execute operations comprising:

detecting a presence of a wireless device in close proximity of the computing system in a non-active state, wherein the non-active state is an Advanced Configuration and Power Interface (ACPI) state other than an active state, and wherein the active state is an ACPI S0 state (S-zero state);

receiving from the wireless device information which is a command that includes a list of operations and a shutdown policy indicating whether the second device should shut down or stay in the active state after completing one or more operations in the list of operations;

determining whether or not the computing system should be in an active state according to the list of operations received from the wireless device; and activating the computing system in response to a determination that the list of operations includes an operation for activating the computing system, the activation being placing the computing system in an active state.

26. The computing system as recited in claim 25, further comprising:

a wireless detector configured to detect the presence of the wireless device and to receive the information from the wireless device that is in close proximity of the wireless detector.

27. The computing system as recited in claim 25, wherein the activating operation occurs in response to determining that the computing system should be in the active state.

28. The computing system as recited in claim 25, wherein the computing system remains in the active state for up to a defined duration before returning to the non-active state.

29. The computing system as recited in claim 25, wherein the detecting operation includes the detection of the presence of the wireless device in close proximity of the computing system based on a Near Field Communication (NFC) technology.

* * * * *